Oct. 16, 1945.    B. JOBIN    2,386,866
ELECTRIC SIGNALING PLANT FOR VEHICLE TRAFFIC
Filed Nov. 26, 1941    4 Sheets-Sheet 1

Inventor·
BERNARD JOBIN
By:
E. F. Wenderoth
Attorney

Oct. 16, 1945.   B. JOBIN   2,386,866
ELECTRIC SIGNALING PLANT FOR VEHICLE TRAFFIC
Filed Nov. 26, 1941   4 Sheets-Sheet 3

Inventor:
BERNARD JOBIN
By: E. F. Wenderoth
Attorney

Oct. 16, 1945.  B. JOBIN  2,386,866
ELECTRIC SIGNALING PLANT FOR VEHICLE TRAFFIC
Filed Nov. 26, 1941  4 Sheets-Sheet 4

Inventor:
BERNARD JOBIN
By: E. F. Wenderoth
Attorney

Patented Oct. 16, 1945

2,386,866

UNITED STATES PATENT OFFICE 2,386,866

ELECTRIC SIGNALING PLANT FOR VEHICLE TRAFFIC

Bernard Jobin, Arlesheim, near Basel, Switzerland, assignor to Société Suisse d'Electricité et de Traction, Basel, Switzerland, a Swiss corporation Application November 26, 1941, Serial No. 420,586
In Switzerland December 11, 1940

10 Claims. (Cl. 246—122)

This invention relates to electric signaling plants and has for its primary object to provide such a plant specially adaptable to a network comprising a contact line such as the double lead traction lines used for propelling for example electrically driven road or rail vehicles such as so called trolley buses, electric tramcars or electric trains, the purpose of said plant being chiefly to announce or indicate at several stations spaced along the route or routes followed by the vehicles the approach of the next oncoming vehicle.

Another object of the invention is to provide an electric signaling plant fulfilling the aforesaid purpose and capable of furnishing to passengers who await the arrival of a vehicle simple and easily legible indications e. g. in terms of time or distance about the next oncoming vehicle.

A further object of the invention is to provide an electric signaling plant or installation fulfilling the aforesaid purpose and wherein the double leads comprised in the contact line for supplying the motive current to the vehicles by such contacting contrivances as trolleys or stirrups are also used for conveying, without disturbing the transmission of the motive current, signaling currents having alternating characteristics and adapted to operate the announcing means located at each station for giving an indication of the time to elapse or of the distance to be covered before the next oncoming vehicle arrives.

Still a further object of the invention is to provide an electric signaling plant capable of fulfilling the aforesaid purpose and rendering proper announcement possible even when the vehicles travel along several routes which are coincident over a portion of their extent.

Still another object of the invention is to provide an electric signaling plant for the aforesaid purpose wherein each of the announcing means provided at the stations spaced along the line is responsive only to that signaling current which corresponds to the nearest oncoming vehicle whereby no overlapping or mutual jamming of announcements from different vehicles may take place and each announcement is always clear and refers only to the expected vehicle.

Still a further object of the invention is to provide an electric signaling plant as aforesaid wherein the announcing means located at each station and which advantageously comprises a time graduated voltmeter automatically resumes its initial operative position as soon as on arrival of the vehicle at said station it has reached zero voltage position.

With these and such other objects in view as will incidentally appear hereafter, the invention comprises the novel construction, combination and arrangement of parts that will now be described with reference to the accompanying diagrammatic drawings forming a part of the present disclosure and illustrating by way of non-limitative examples constructional forms of an improved plant according to the invention.

Figure 1:
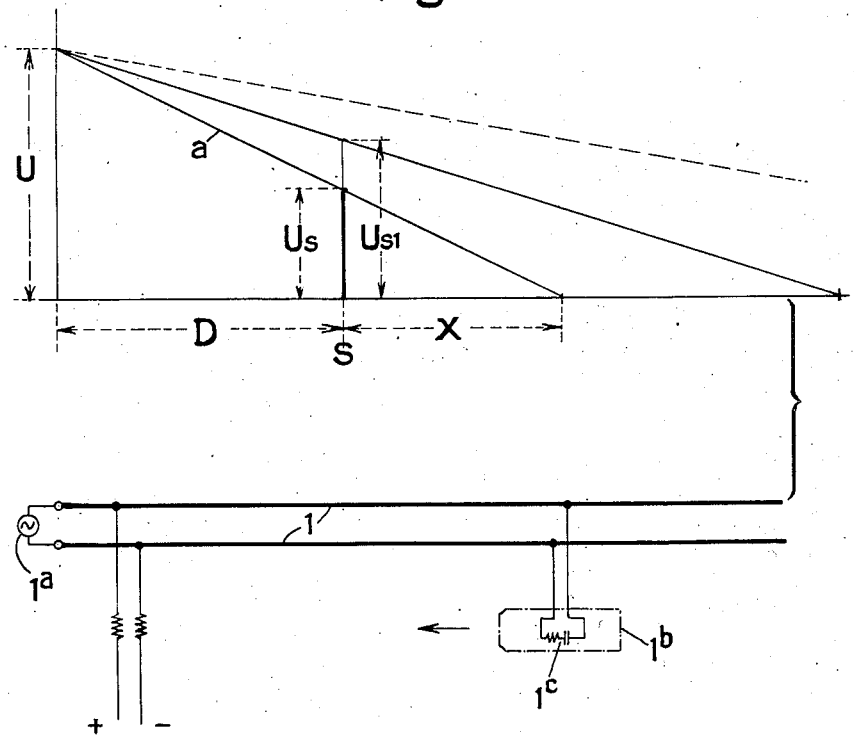
Figure 1 is a diagrammatic view illustrating the principle on which the invention is founded.

Referring first to Figure 1, the numeral 1 designates the two wires of which is made up a double contact line carrying direct current such for example as a line adapted to furnish current to so-called "trolley buses" or electric omnibuses. The line 1 is fed, on the one hand, by the direct traction or driving current and, on the other hand, by an alternating signaling current which is so to speak superimposed to said driving current. For that purpose, a source of current $1^a$ adapted to generate constant alternating signaling current is connected to the remote end of the line 1 towards which the vehicle is traveling.

Each vehicle, one of which is diagrammatically shown at $1^b$ in Figure 1, is fitted in addition to the usual electric drives (not shown) such as a driving motor, a starting resistor, etc. with a short-circuiting device $1^c$ adapted to interconnect both wires of the line 1 for the flow of the alternating signaling current without, however, causing disturbances of the direct driving current. Such short-circuiting causes a variation in the tension of the alternating signaling current along the contact line 1. Such tension has its maximum value at the end of the line 1 adjacent the current source $1^a$ and a zero value adjacent the vehicle (where short-circuiting takes place). Intermediate these two spots such tension varies in terms of a practically linear law as illustrated by the straight line $a$ in the upper part of Figure 1. By examining the chart shown in Figure 1 and by assuming that:

U: constant tension adjacent the current source $1^a$;

Us: tension adjacent the stopping station S;
X: distance between the vehicle $1^b$ and the stopping station S;
D: distance between the stopping station S and the current source $1^a$,
it will be seen that:

$$\frac{Us}{X} = \frac{U}{D+X}$$

whence results $$X = D\frac{Us}{U-Us}$$

Consequently assuming the invariable factors U and D, which are indicated once for all, on the one hand, to be known beforehand and the variable factor Us, which can be measured at the stopping station S, to be also known, it will be seen that the tension Us as measured at the stopping station S is in direct ratio of the distance X between the vehicle $1^b$ and the stopping station S. This holds true for each of the stopping stations towards which the vehicle $1^b$ is travelling. In other words, it is possible, at each stopping station, to reckon the distance at which the next vehicle is then situated merely by measuring the tension of the signaling current. Assuming moreover all vehicles travelling on the same line to move at a substantially constant commercial speed, it will be possible to determine, with a sufficient degree of approximation, the time which will elapse until the arrival of the nearest vehicle from the stopping station being considered.

In proportion as the distance between the station S and the oncoming vehicle $1^b$ grows smaller, the current tension adjacent said station gradually diminishes and reaches a zero value when the vehicle reaches the same. Therefore variation of the signaling tension is a faithful representation of the variation of the distance between said station and the oncoming vehicle.

As above stated, a proportionate ratio exists between the current tension adjacent a station and the time required by a vehicle to reach the same. Consequently by fitting the signaling boards at the stopping stations along the line with voltmeters provided with time scales, passengers will obtain direct information as regards the time to elapse until the passing of the next vehicle due to arrive.

Several electric omnibuses or like vehicles may travel on one and the same line. Although they are fed by a common source of alternating signaling current, each station may be equipped with such means as to give an independent indication of the time required for the nearest oncoming vehicle to travel over the distance between it and said station. Such a result may be obtained by using either the one or the other of the following constructional forms, namely:

(1) Short-circuiting of the electrically driven omnibuses may be rendered intermittent by means of contactors fitted on said omnibuses, whereby the operation of said contactors, which have an arbitrarily chosen period of engagement, enable the several signaling tensions which correspond to the locations of the operating vehicles to be measured at each station.

(2) The source of signaling current is periodically switched on by means of an automatic contactor arranged in the feeding station. Each vehicle should then be fitted with a relay adapted to interrupt short-circuiting on the vehicle when the signaling current flows through said relay.

Such an interruption of the short-circuiting on the vehicle occurs with a certain lag. This provides for proper operation of all the announcing stations tapped upon the circuit between the source of current and the electrically driven vehicle. Whenever the contactor is engaged, the short circuits in the vehicles are successively cut out by the relays in a sequence corresponding to that of the vehicles. This permits the several signaling tensions which correspond to the locations of the vehicles to be measured. Whenever a contactor is disengaged, all relays resume their inoperative position and re-engage the short-circuiting means, so that the circuit is prepared for a new operation.

In both cases, the items of interest are the distance between the station and the nearest oncoming vehicle or the time at which said vehicle will reach said station. It will be understood that it is this vehicle which produces at said station towards which it is travelling the lowest tension amongst all such other tensions as are produced by the other vehicles in service along the line.

Consequently it is only sufficient for the voltmeter to be so arranged as to merely indicate the lowest tension (different from zero voltage) amongst the several tensions which will be applied thereto. This will be more easily understood by referring back to the chart on Figure 1. It will be seen on said chart that a signaling tension Us corresponds at the stopping station S with the nearest vehicle travelling towards it, while a signaling tension Usl (larger than Us) corresponds at said station with a more remote vehicle.

Figure 2:
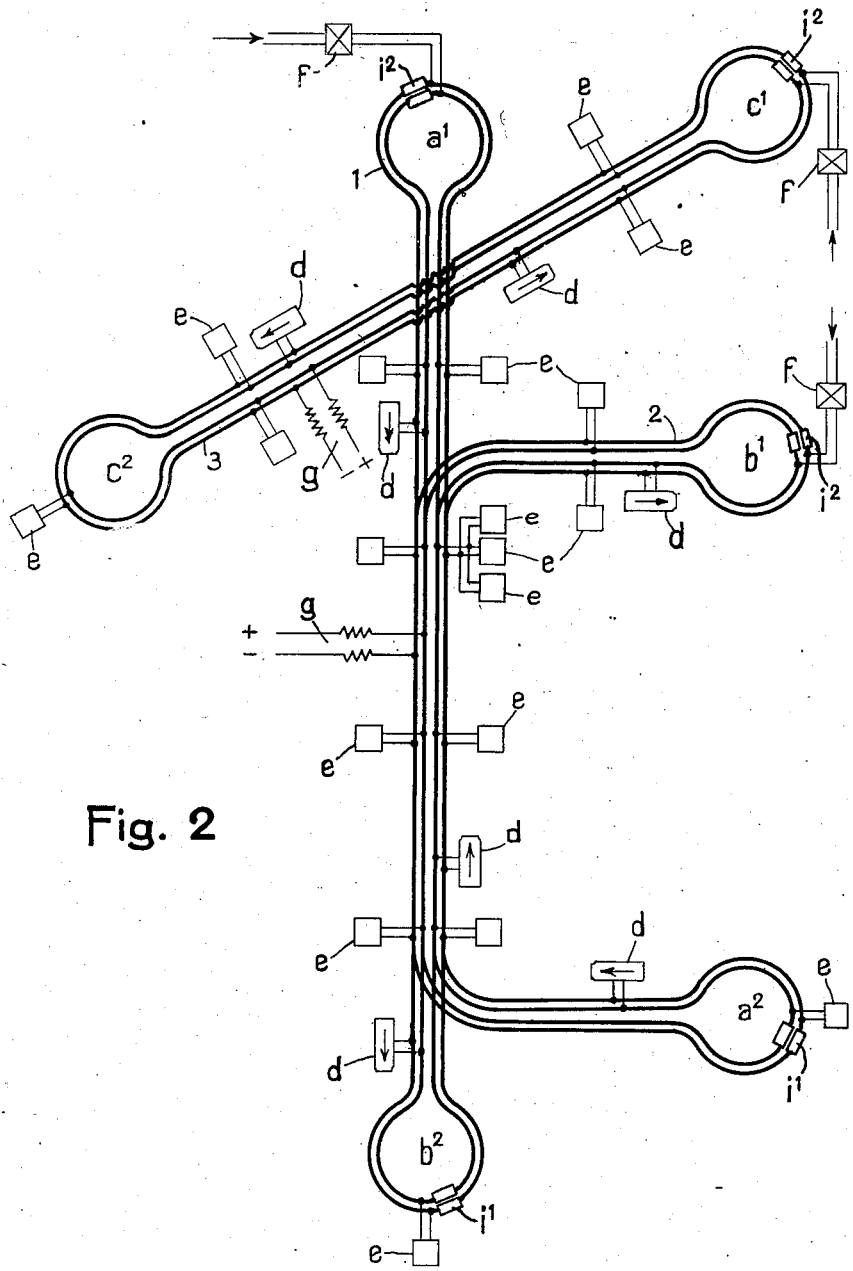
Figure 2 is a diagrammatic view showing generally a network through which a direct current flows for tractive purposes.

In Figure 2 is shown diagrammatically the general network or wiring of a direct driving line adapted to propel electrically driven omnibuses or so called "trolley buses." Such network comprises three separate contact lines defined respectively by 1, 2 and 3. The line 1 extends from $a^1$ to $a^2$; the line 2 extends from $b^1$ to $b^2$, and the line 3 extends from $c^1$ to $c^2$. In such diagrammatic illustration are, moreover, shown at d the electrically driven omnibuses or like vehicles which travel along the network as shown. The references e designate the announcing means situated at the respective stopping stations, while the references g designate the feeder wires by which the direct driving current is led, and the references f designate the feeders by which the contact lines are fed with alternating signaling current.

Where, as shown in Figure 2, two or more bus routes use a common portion of the contact line, signaling frequencies should be selected in a number equal to that of said routes and each station should be equipped with a number of measuring instruments equal to that of said frequencies as shown at one of the stations in Fig. 2 of the drawings. Proper selection between the several frequencies to be measured should be effected by means of suitable filters such as $i^1$. Means are provided in that way to separately indicate for each bus route the time (or distance) to elapse (or to be covered) until the nearest vehicle due to arrive actually reaches the stopping station.

All current feeding and using points are provided with such filters as $i^2$ adapted to isolate the driving circuits from the signaling circuits.

Figure 3:
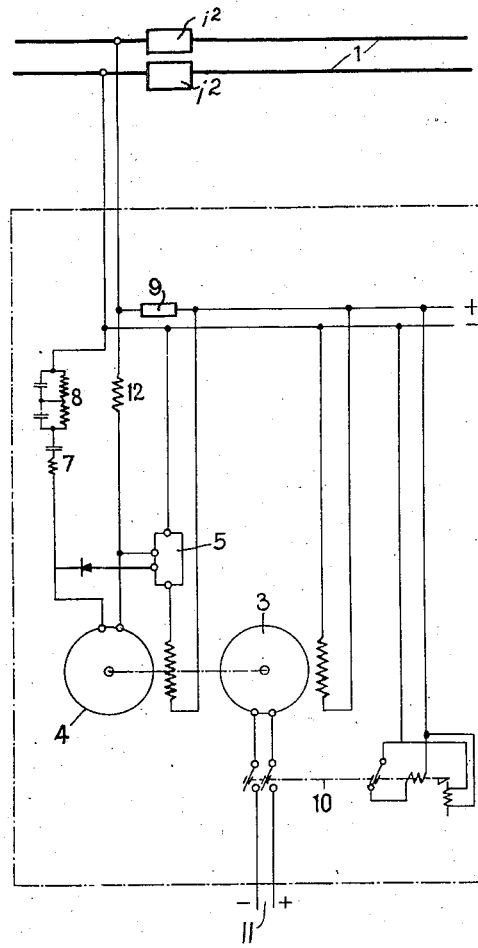
Figures 3, 4 and 5 are diagrammatic views showing respectively the several parts of which is made up a signaling plant constituting a primary embodiment of the invention.
Figure 4:
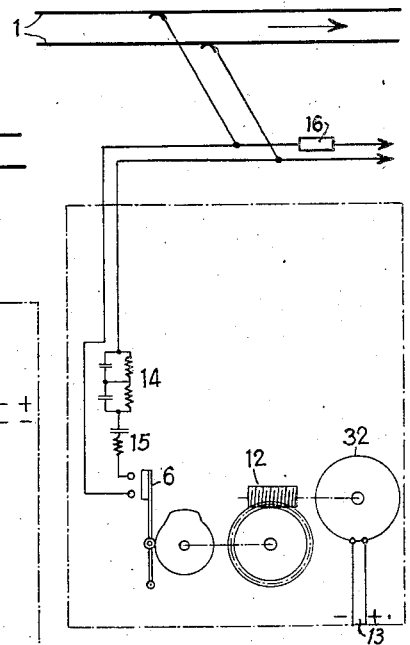
Figure 5:
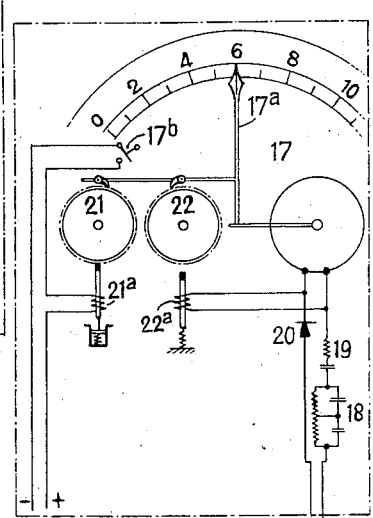

In the continuation of this description will now be described in a more detailed way two different plants by which the aforesaid constructional embodiments may be conveniently carried into practice. In Figure 3 is shown the feeder for the signaling circuit; in Figure 4 is shown the short-circuiting device fitted on each vehicle, and in Figure 5 is shown one of the announcing stations comprised in the primary plant.

The feeder (Figure 3) comprises a single phase alternator 4 having a constant frequency and tension, said alternator feeding the signaling circuit through resonating circuits 8 which prevent any flow of currents having frequencies different from the one of the alternator 4. A resonating circuit 7 is provided for preventing the driving current from flowing through the alternator 4. The latter is driven at a constant speed by a synchronous motor 3 fed by a source of alternating current 11. The alternator tension is held constant by a tension regulator 5. An impedance such as 12 limits the signaling current when the vehicle approaches the feeder. The direct driving current feeds the exciting circuits of the motor 3 and alternator 4 and operates a switch 10 controlling the motor 3 so as to automatically start or stop said motor when the driving current is switched on or off.

A filter such as $i^2$ is provided for precluding the flow of alternating currents of all frequencies through the contact line 1 which brings the current to the rear end of the vehicles. Another filter such as 9 is provided likewise in conjunction with the exciting circuits of the machines at the feeder.

The short-circuiting device (Figure 4) which is provided on each vehicle comprises a contactor 6 adapted to periodically short-circuit both poles of the contact line 1. This device is actuated by a motor 32 through a reducing gear 12. The motor 32 is fed by an auxiliary source of current 13 such for example as a battery. If required, the motor 32 might be fed by the driving current itself. The signaling circuit is closed through filter circuits 14 which prevent the flow of all currents having frequencies different from the one suited to the vehicle. A resonating circuit 15 is provided for limiting the action of the contactor 6 to a current of suitable frequency to the exclusion of the driving current. Another filter such as 16 is provided for preventing alternating currents of all frequencies from flowing to the feeding circuits of the power means of the vehicle.

The announcing station (Figure 5) comprises a voltmeter 17 provided with a time (distance) scale and tapped upon both polar leads of the contact line 1. The voltmeter 17 is fed through filter circuits 18 which are adapted to prevent any flow of currents having frequencies different from those of the current which must be measured by the apparatus. A resonating circuit 19 prevents the driving current from having any influence on the voltmeter 17 whose feeding current is rectified by a valve such as 20.

A locking disc 21 (having peripheral teeth or serrations cooperating for example with a pawl) is provided in conjunction with a relay 21ª, so that the pointer 17ª of the voltmeter 17 can only move towards the zero index on the scale so as to register such decreasing tensions as are applied to it as the oncoming vehicle approaches the station. Whenever an electrically driven vehicle fed by the line reaches the stopping station, the tension on the terminals of the voltmeter 17 falls to zero, whereupon the pointer 17ª engages through a limiting switch 17ᵇ the circuit of the relay 21ª, so that the disc which locked the pointer 17ª is freed. Said pointer can then, under the impulse due to the maximum signaling tension which always appears periodically, owing to the operation of the contactors 6 (Figure 4) fitted on the vehicles, move back to the top end of the scale on the voltmeter 17, whereafter said pointer is ready to register the decreasing tensions which bring out the approach of the next vehicle. In order that the voltmeter 17 should not respond to the zero voltage which prevails when a short circuit is caused by the contactor 6 of a vehicle which has already travelled beyond the stopping station, the return of the voltmeter pointer 17ª to the zero index on the scale is precluded by the action of another locking disc 22 operated by a zero voltage relay 22ª directly connected to the circuit feeding the voltmeter. For this purpose, the locking disc 22 may also be provided with peripheral teeth or serrations cooperating for example with a pawl arranged as shown in Fig. 5 so that, upon actuation of relay 22ª, the pointer 17ª of the voltmeter cannot move toward the zero mark on the scale. In order that relay 21ª may not immediately again lock disc 21 upon movement of pointer 17ª toward starting position and upon consequent re-opening of switch 17ᵇ, dashpot means (shown on Fig. 5 below relay 21ª) is provided so that the return of the relay 21ª to disc-locking position is retarded long enough to enable pointer 17ª to move to initial operative position.

Figure 6:
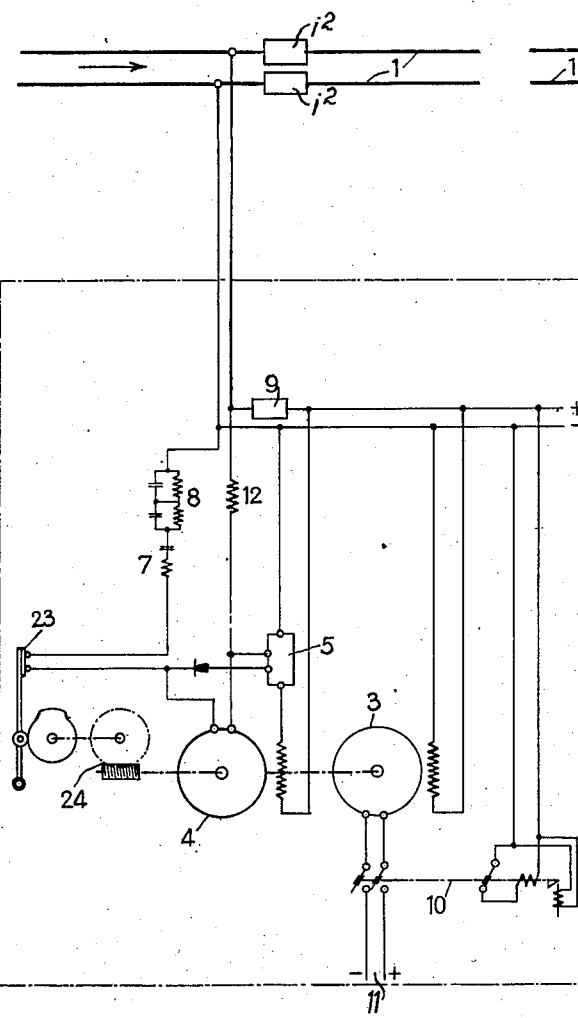
Figures 6 and 7 are similar diagrammatic views showing certain parts of a signaling plant constituting another embodiment of the invention.

In the alternative constructional form to which reference has already been made, and as illustrated in Figure 6, the feeding circuit is as above described, except that the current delivered by the alternator 4 is periodically cut out by an automatic contactor 23. Said contactor controls the sequential engagement of all the short-circuiting relays as provided on the respective vehicles which travel along the line. The contactor 23 is operated through a reducing gear 24 from the motor 3 which drives the alternator 4.

Figure 7:
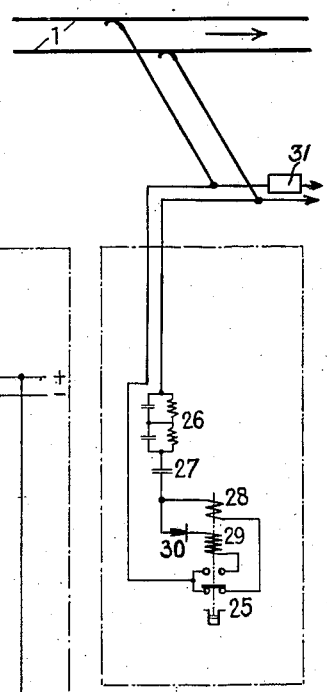

The short-circuiting device (Figure 7) as also provided on each vehicle comprises in the present constructional form a relay 25 adapted to short-circuit both polar leads of the contact line 1 through circuits 26 which check the flow of currents having frequencies different from the one of the current suitable for the vehicle. A resonating circuit 27 (comprising the condenser and coil 28 of the relay 25) enables the action of the relay to be limited to that current having a suitable frequency to the exclusion of the traction current.

The relay 25 operates when the signaling current flows through the winding (coil) 28. It interrupts the short-circuit set up on the electrically driven vehicle and engages the circuit of a retaining coil (tension coil) 29 through a rectifier 30. This relay functions with a slight lag, so that all the announcing stations tapped between the vehicle and the feeder can operate correctly. The winding 29 holds the vehicle short-circuiting means in open condition as long as the signaling current has not been cut out by the automatic contactor 23 belonging to the feeder. When the short-circuit is interrupted by the relay 25 on the first vehicle, the section of the signaling circuit of the next vehicle that follows said first vehicle is placed under tension to suit conditions which are determined by the short-circuit then prevailing on said next vehicle, so that the announcing stations tapped between these two vehicles can operate. After a certain period of time, the relay 25 associated with said next vehicle also functions and cancels the short-circuit on said vehicle, so that the section of the line following it is placed under tension. The announcing implements which are arranged between the second and third vehicle can then operate. It will be seen that the signaling current is sequentially switched on all the vehicles which simultaneously travel along the same line. This permits operation of all the announcing stations which thus always announce the arrival of the nearest oncoming vehicle without being influenced by any of the outgoing vehicles.

The period of engagement of the contactor 23 at the announcing station is adapted to permit a sequential operation of all the relays belonging to vehicles which travel simultaneously on the same line. Whenever the contactor is disengaged, all relays move back to their inoperative position and re-engage the short-circuiting means, thereby preparing the circuit for a new operation, as above stated.

A filter 31 is provided for preventing alternating current of any frequency from passing through the feeding circuits of the propelling means on the vehicles.

The announcing stations of this second constructional form or plant are similar to those described above in connection with the first constructional form.

Obviously the foregoing description given in connection with a direct current network feeding electrically driven omnibuses and comprising a two lead contact line still holds true where said contact line only comprises one lead and the return of the current takes place through the earth or, alternatively, where traction is performed by any form of alternating current. The same signaling system can, moreover, be adapted to any other form of traction other than electric traction such for example as steam engine or Diesel engine traction, owing to the arrangement of a special lead such as a wire or third rail properly insulated for conducting the signaling current impulses.

It will be also understood that, without departing from the general scope of the invention, the source of current such as 1ª in Figure 1 may be, instead of being an alternator as stated by way of example, any suitable generator of alternating currents such as oscillating circuits, vibrating devices, switches, etc. Moreover, while the signaling current has been stated to be alternating current, it may as well be pulsatory current or in other words current obtained by rectifying alternating current.

Numerous minor constructional details might be varied without sacrificing the aforesaid advantages and departing from the ambit of the subjoined claims.

What I claim is:

1. An electric signaling system for electrically operated vehicles comprising a source of driving current, a contact line extending along the path of said vehicles for feeding driving current from said source to each of a sequence of vehicles travelling along said line, and means for indicating the approach of its next oncoming vehicle at one at least of a plurality of stations spaced along and electrically connected with said line, said means comprising a source of alternating signaling current having an electrical feeder connection with said contact line at a fixed point along said line whereby said signaling current is superimposed upon said driving current and is also fed to each of said vehicles, a driving circuit and a signaling circuit on each vehicle, each including means to permit current from its respective source only to flow therethrough, means on each vehicle for short-circuiting said signaling current and thereby establishing a signaling circuit between each vehicle and said feeder connection, the voltage of said last-named signaling circuit decreasing at said station between said next oncoming vehicle and said feeder connection as the vehicle approaches said feeder connection, switch means for periodically interrupting the short-circuits, and voltage responsive means at said station and connected to said line through means preventing flow of driving current but permitting flow of signaling current, whereby said voltage responsive means indicates the distance from its station of the vehicle nearest thereto on the side of the line away from said feeder connection.

2. An electric signaling system for electrically operated vehicles comprising a source of driving current, a contact line extending along the path of said vehicles for feeding driving current from said source to each of a sequence of vehicles travelling along said line, and means for indicating the approach of its next oncoming vehicle at each of a plurality of stations spaced along and electrically connected with said line, said means comprising a source of alternating signaling current having an electrical feeder connection with said contact line at a fixed point along said line whereby said signaling current is superimposed upon said driving current and is also fed to each of said vehicles, a driving circuit and a signaling circuit on each vehicle, each including means to permit current from its respective source only to flow therethrough, means on each vehicle for short-circuiting said signaling current and thereby establishing a signaling circuit between each vehicle and said feeder connection, the voltage of said last-named signaling circuit decreasing at each said station between said next oncoming vehicle and said feeder connection as the vehicle approaches said feeder connection, switch means for periodically interrupting the short-circuits, said switch means including an automatic commutator at the feeder connection and a relay on each vehicle, said relay normally closing said short-circuit and adapted, when energized, to open said short-circuit only after a predetermined time and to maintain said short-circuit open, and voltage responsive means at each station and connected to said line through means preventing flow of driving current but permitting flow of signaling current, whereby said voltage responsive means indicates the distance from its respective station of the vehicle nearest thereto on the side of the line away from said feeder connection.

3. An electric signaling system for electrically operated vehicles comprising a source of driving current, a contact line extending along the path of said vehicles for feeding driving current from said source to each of a sequence of vehicles traveling along said line, and means for indicating the approach of its next oncoming vehicle at each of a plurality of stations spaced along and electrically connected with said line, said means comprising a source of alternating signaling current having an electrical feeder connection with said contact line at a fixed point along said line whereby said signaling current is superimposed upon said driving current and is also fed to each of said vehicles, a driving circuit and a signaling circuit on each vehicle, each including electrical filter means to permit current from its respective source only to flow therethrough, thereby preventing mutual interference between driving current and signaling current, means on each vehicle for short-circuiting said signaling current and thereby establishing a signaling circuit between each vehicle and said feeder connection, the voltage of said last-named signaling circuit decreasing at each said station between said next oncoming vehicle and said feeder connection as the vehicle approaches said feeder connection, switch means for periodically interrupting the short-circuits, said switch means including an automatic commutator at the feeder connection and a relay on each vehicle, said relay normally closing said short-circuit and adapted, when energized, to open said short-circuit only after a predetermined time and to maintain said short-circuit open, and voltage responsive means at each station and connected to said line through means preventing flow of driving current but permitting flow of signaling current, whereby said voltage responsive means indicates the distance from its respective station of the vehicle nearest thereto on the side of the line away from said feeder connection.

4. An electric signaling system for electrically operated vehicles comprising a source of driving current, a contact line extending along the path of said vehicles for feeding driving current from said source to each of a sequence of vehicles travelling along said line, and means for indicating the approach of its next oncoming vehicle at each of a plurality of stations spaced along and electrically connected with said line, said means comprising a source of alternating signaling current having an electrical feeder connection with said contact line at a fixed point along said line whereby said signaling current is superimposed upon said driving current and is also fed to each of said vehicles, a driving circuit and a signaling circuit on each vehicle, each including means to permit current from its respective source only to flow therethrough, means on each vehicle for short-circuiting said signaling current and thereby establishing a signaling circuit between each vehicle and said feeder connection, the voltage of said last-named signaling circuit decreasing at each said station between said next oncoming vehicle and said feeder connection as the vehicle approaches said feeder connection, switch means for periodically interrupting the short-circuits, and voltage responsive means at each station and connected to said line through means preventing flow of driving current but permitting flow of signaling current, said voltage responsive means including a voltmeter having a pointer movable in front of a scale, a relay-controlled non-return locking device connected to said pointer and a limiting switch in series with said last-named relay and operated by said pointer, whereby said voltage responsive means indicates the distance from its respective station of the vehicle nearest thereto on the side of the line away from said feeder connection.

5. An electric signaling system for electrically operated vehicles comprising a source of driving current, a contact line extending along the path of said vehicles for feeding driving current from said source to each of a sequence of vehicles travelling along said line, and means for indicating the approach of its next oncoming vehicle at each of a plurality of stations spaced along and electrically connected with said line, said means comprising a source of alternating signaling current having an electrical feeder connection with said contact line at a fixed point along said line whereby said signaling current is superimposed upon said driving current and is also fed to each of said vehicles, a driving circuit and a signaling circuit on each vehicle, each including means to permit current from its respective source only to flow therethrough, means on each vehicle for short-circuiting said signaling current and thereby establishing a signaling circuit between each vehicle and said feeder connection, the voltage of said last-named signaling circuit decreasing at each said station between said next oncoming vehicle and said feeder connection as the vehicle approaches said feeder connection, switch means for periodically interrupting the short-circuits, and voltage responsive means at each station and connected to said line through means preventing flow of driving current but permitting flow of signaling current, said voltage responsive means including a voltmeter having a pointer, a relay-controlled releasable locking device connected to said pointer, and a zero-voltage relay-controlled releasable locking device also connected to said pointer, whereby said voltage responsive means indicates the distance from its respective station of the vehicle nearest thereto on the side of the line away from said feeder connection.

6. An electric signaling system for electrically operated vehicles comprising a source of driving current, a contact line extending along the path of said vehicles for feeding driving current from said source to each of a sequence of vehicles travelling along said line, and means for indicating the approach of its next oncoming vehicle at each of a plurality of stations spaced along and electrically connected with said line, said means comprising a source of alternating signaling current having an electrical feeder connection with said contact line at a fixed point along said line whereby said signaling current is superimposed upon said driving current and is also fed to each of said vehicles, a driving circuit and a signaling circuit on each vehicle, each including means to permit current from its respective source only to flow therethrough, means on each vehicle for short-circuiting said signaling current and thereby establishing a signaling circuit between each vehicle and said feeder connection, the voltage of said last-named signaling circuit decreasing at each said station between said next oncoming vehicle and said feeder connection as the vehicle approaches said feeder connection, switch means for periodically interrupting the short-circuits, said switch means including a contactor, a motor for operating said contactor through the intermediary of a reducing gear, and voltage responsive means at each station and connected to said line through means preventing flow of driving current but permitting flow of signaling current, whereby said voltage responsive means indicates the distance from its respective station of the vehicle nearest thereto on the side of the line away from said feeder connection.

7. An electric signaling system for electrically operated vehicles comprising a source of driving current, a contact line extending along the path of said vehicles for feeding driving current from said source to each of a sequence of vehicles traveling along said line, and means for indicating the approach of its next oncoming vehicle at each of a plurality of stations spaced along and electrically connected with said line, said means comprising a source of alternating signaling current having an electrical feeder connection with said contact line at a fixed point along said line whereby said signaling current is superimposed upon said driving current and is also fed to each of said vehicles, a driving circuit and a signaling circuit on each vehicle, said driving circuit including means to permit driving current only to flow therethrough, means on each vehicle for short-circuiting said signaling current and thereby establishing a signaling circuit between each vehicle and said feeder connection, the voltage of said last-named signaling circuit decreasing at each said station between said next oncoming vehicle and said feeder connection as the vehicle approaches said feeder connection, switch means for periodically interrupting the short-circuits, said switch means including a contactor, a motor for operating said contactor through the intermediary of a reducing gear, filter and resonating circuits interposed between the terminals of the said contactor and the leads thereto from the contact line, and voltage responsive means at each station and connected to said line through means preventing flow of driving current but permitting flow of signaling current, whereby said voltage responsive means indicates the distance from its respective station of the vehicle nearest thereto on the side of the line away from said feeder connection.

8. An electric signaling system for electrically operated vehicles comprising a source of driving current, a contact line extending along the path of said vehicles for feeding driving current from said source to each of a sequence of vehicles traveling along said line, and means for indicating the approach of its next oncoming vehicle at each of a plurality of stations spaced along and electrically connected with said line, said means comprising a source of alternating signaling current having an electrical feeder connection with said contact line at a fixed point along said line whereby said signaling current is superimposed upon said driving current and is also fed to each of said vehicles, a driving circuit and a signaling circuit on each vehicle, each including means to permit current from its respective source only to flow therethrough, means on each vehicle for short-circuiting said signaling current and thereby establishing a signaling circuit between each vehicle and said feeder connection, the voltage of said last-named signaling circuit decreasing at each said station between said next oncoming vehicle and said feeder connection as the vehicle approaches said feeder connection, switch means for periodically interrupting the short-circuits, and voltage responsive means at each station and connected to said line through means preventing flow of driving current but permitting flow of signaling current, said voltage responsive means including a voltmeter having a pointer, a relay-controlled releasable locking device connected to said pointer, said locking device being released when said voltage responsive means indicates no voltage and means for retarding the re-engagement thereof, and a zero-voltage relay-controlled releasable locking device also connected to said pointer, whereby said voltage responsive means indicates the distance from its respective station of the vehicle nearest thereto on the side of the line away from said feeder connection.

9. An electric signaling system for electrically operated vehicles comprising a source of driving current, a contact line extending along the path of said vehicles for feeding driving current from said source to each of a sequence of vehicles travelling along said line, and means for indicating the approach of its next oncoming vehicle at each of a plurality of stations spaced along and electrically connected with said line, said means comprising an alternator generating signaling current and having an electrical feeder connection with said contact line at a fixed point along said line whereby said signaling current is superimposed upon said driving current and is also fed to each of said vehicles, resonating circuits interposed in the last-named connection, a motor actuating the alternator, a driving circuit and a signaling circuit on each vehicle, each including means to permit current from its respective source only to flow therethrough, means on each vehicle for short-circuiting said signaling current and thereby establishing a signaling circuit between each vehicle and said feeder connection, the voltage of said last-named signaling circuit decreasing at each station between said next oncoming vehicle and said feeder connection as the vehicle approaches said feeder connection, switch means for periodically interrupting the short-circuits, and voltage responsive means at each station and connected to said line through means preventing flow of driving current but permitting flow of signaling current, whereby said voltage responsive means indicates the distance from its respective station of the vehicle nearest thereto on the side of the line away from said feeder connection.

10. An electric signaling system for electrically operated vehicles comprising a plurality of sources of driving current, a corresponding plurality of paths along which said vehicles may travel, a contact line extending along each of said paths for feeding driving current from the respective source of driving current to each of said vehicles traveling along said line, several of said lines being coincident over a portion of their extent, and means for indicating the approach of its next oncoming vehicle at each of a plurality of stations spaced along and electrically connected with said lines, said means comprising a source of alternating signaling current for each contact line, the currents of the several sources being of different frequencies, each said source having an electrical feeder connection with its respective contact line at a fixed point along said line whereby the several signaling currents are respectively superimposed on the driving currents and are also fed to the vehicles on the corresponding line, a driving circuit and a signaling circuit on each vehicle, each including means to permit current from its respective source only to flow therethrough, means on each vehicle for short-circuiting said signaling current and thereby establishing a signaling circuit between each vehicle and said feeder connection, the voltage of said last-named signaling circuit decreasing at each station between said next oncoming vehicle and said feeder connection, switch means for periodically cancelling short-circuiting conditions, and voltage responsive means at each station in a number equal to the number of aforesaid different frequencies, each connected to the corresponding contact line through means preventing flow of driving current but permitting flow of signaling current, and filters for selectively isolating the indicating means for operation responsive to the appropriate frequency.

BERNARD JOBIN.